United States Patent [19]
Huber

[11] Patent Number: 6,003,478
[45] Date of Patent: Dec. 21, 1999

[54] DUAL-FUEL CONTROL/MONITORING SYSTEM

[75] Inventor: Jeffrey Thomas Huber, Miami, Fla.

[73] Assignee: ITG Innovative Technology Group Corporation, Weston, Fla.

[21] Appl. No.: 09/354,353

[22] Filed: Jul. 14, 1999

[51] Int. Cl.[6] .................................................. F02B 3/00
[52] U.S. Cl. .................. 123/27 GE; 123/526; 123/676; 123/578
[58] Field of Search ............................. 123/27 GE, 525, 123/526, 575, 676, 576, 578

[56] References Cited

U.S. PATENT DOCUMENTS

| | | | |
|---|---|---|---|
| 2,714,883 | 8/1955 | Metzger | 123/198 |
| 4,278,064 | 7/1981 | Regueiro | 123/575 |
| 4,373,493 | 2/1983 | Welsh et al. | 123/576 |
| 4,597,364 | 7/1986 | Young | 123/27 GE |
| 4,603,674 | 8/1986 | Tanaka | 123/575 |
| 4,619,240 | 10/1986 | Bedford et al. | 123/575 |
| 4,641,625 | 2/1987 | Smith | 123/575 |
| 4,721,078 | 1/1988 | Watanabe et al. | 123/525 |
| 4,909,209 | 3/1990 | Takahasi | 123/27 GE |
| 5,370,097 | 12/1994 | Davis | 123/526 |
| 5,379,740 | 1/1995 | Moore et al. | 123/478 |
| 5,816,224 | 10/1998 | Welsh et al. | 123/525 |
| 5,890,459 | 4/1999 | Hedrick et al. | 123/27 GE |

*Primary Examiner*—Erick R. Solis
*Attorney, Agent, or Firm*—Edward M. Livingston, Esq.

[57] ABSTRACT

A control box (11) for a dual-fuel internal-combustion engine (6) is actuated automatically by an oil-pressure switch (16) when activated by a manual switch (30) that directs power from a battery (29) or other engine-electrical component to a current distributor such as a 24-volt bus (49) for operating control-box components that include an under-current sensor (36) for preventing use of gaseous fuel in addition to liquid fuel under no-load and low-load conditions, an over-current sensor (39) for preventing use of gaseous fuel in addition to liquid fuel under excessive-load conditions, an intake-air sensor (17) for preventing use of gaseous fuel with liquid fuel when there is inadequate supply of air, a liquid-fuel-supply sensor (22) for preventing use of gaseous fuel with liquid fuel when there is inadequate supply of liquid fuel, and an exhaust-gas-temperature monitor (23) for shutting down dual-fuel mode when exhaust heat is excessive. Red LED lights (41, 42, 43, 44, 45, 46) warn of system faults. The engine does not shut down when one or more parameters fail. Professional resetting is required in order to alert operators of possible dangers when the system has been shut down from excessive exhaust-gas heat.

20 Claims, 6 Drawing Sheets

DUAL-FUEL CONTROL/MONITORING SYSTEM

BACKGROUND OF THE INVENTION

This invention relates to control and monitoring systems for dual-fuel engines.

Gaseous fuels such as various grades of natural gas and gaseous derivatives of various forms of hydrocarbons have been used in combination with liquid hydrocarbon fuels such as low-end hydrocarbons, commonly known as diesel or jet fuel, and high-end hydrocarbons, commonly known as gasoline, in compression-ignition engines particularly, and to some extent in electrical-ignition engines. Because of their gaseous state, the gaseous hydrocarbon fuels mix more thoroughly with air oxidizer and, therefore, combust more completely, faster and generally at higher temperatures than the liquid hydrocarbon fuels, even though their density of hydrocarbons is lower than for liquid hydrocarbon fuels. Additionally, the higher speed and completeness of combustion of the gaseous hydrocarbon fuels aids completeness and speed of combustion of the liquid hydrocarbon fuels. Results include (a) increased output power from relatively low-cost and globally more abundant gaseous hydrocarbon fuels, (b) increased power per consumption of the liquid hydrocarbon fuels, (c) lower exhaust pollution, and (d) conservation of less abundant liquid hydrocarbon fuels that generally cost more to produce.

Engine problems occur, however, in relation to control of dual-fuel systems. A major problem is the higher combustion heat related to the advantages of dual fuel. The control problems are preventable with sufficient monitoring and regulation of the particular engine functions, including ultimately terminating supply of the gaseous fuel without shutting off the engine in the event of higher combustion heat than supportable by a cooling system of the engine.

There are known means and methods for monitoring and controlling dual-fuel engines, but none with the effectiveness, reliability and low cost made possible by this invention.

Examples of different but related monitoring and control technologies for dual-fuel engines are described in the following patent documents. U.S. Pat. No. 5,890,459, issued to Hedrick, et al. on Apr. 6, 1999, described a dual-fuel engine having three separate injectors in diesel-engine cylinders for separately timed and controllably metered injection of diesel fuel and gaseous fuel. U.S. Pat. No. 5,370,097, issued to Davis on Dec. 6, 1994, described a dual-fuel control system and method having an actuation controller of gaseous and liquid fuel conveyed to an internal-combustion engine in response to a sensor of rotational speed and a sensor of exhaust temperature of the engine. U.S. Pat. No. 5,379,740, issued to Moore, et al. on Jan. 10, 1995, described a dual-fuel, pre-compression injection system and method for controlling flow of liquid and gaseous fuel through the same lines into an engine inlet manifold from separate tanks. U.S. Pat. No. 4,909,209, issued to Takahasi on Mar. 20, 1990, described injecting LP gas from an LP cylinder into a diesel-engine air inlet through an injector nozzle in response to minimum engine heat and rotational speed. U.S. Pat. No. 4,641,625, issued to Smith on Feb. 10, 1987, described a computerized control system for controlling injection rates of liquid and gaseous fuel to a dual-fuel engine. U.S. Pat. No. 4,619,240, issued to Bedford, et al. on Oct. 28, 1986, described control of dual-fuel injection rates by computerized control in response to pressure in a fuel line for primary fuel intermediate a fuel pump and an injector. U.S. Pat. No. 4,603,674, issued to Tanaka on Aug. 5, 1986, described control of rates of injection of gaseous and liquid fuels to a dual-fuel engine in computerized response to difference between actual engine speed and a predetermined rate of speed per rate of injection of a primary fuel. U.S. Pat. No. 4,597,364, issued to Young on Jul. 1, 1986, described timing injection of a gaseous fuel into cylinders that are next in line for combustion. U.S. Pat. No. 2,714,883, issued to Metzger on Aug. 9, 1955, described means for stopping a dual-fuel engine by shutting off all fuel in order to purge the engine as a result of failure of any one of a plurality of engine components or functions such as low oil pressure, excessive water-jacket temperature, excessive rotational speed and failure of air supply.

SUMMARY OF THE INVENTION

Objects of patentable novelty and utility taught by this invention are to provide a dual-fuel engine with a dual-fuel-engine monitoring-and-control system which:

actuates, varies, terminates and reactivates fumigation of a gaseous fuel in response to predetermined engine-oil pressure;

terminates and reactivates fumigation of the gaseous fuel in response to predetermined vacuums downstream from an intake-air filter and downstream from a liquid-fuel filter in order to assure proper supply of oxidizer and fuels;

terminates and reactivates fumigation of the gaseous fuel in response to predetermined pressure of gaseous fuel downstream from a gaseous-fuel container;

activates danger signaling in response to predetermined levels of intake-air vacuum and fuel-supply pressure;

terminates and reactivates fumigation of the gaseous fuel in response to predetermined levels of current generated by a generator output; and terminates fumigation of the gaseous fuel in response to predetermined exhaust-gas temperature immediately downstream from exhaust porting.

To achieve these and other objectives, a control box for a dual-fuel internal-combustion engine is actuated automatically by an oil-pressure switch when activated by a manual switch that directs power from a battery or other engine-electrical component to a current distributor such as a 24-volt bus for operating control-box components that include components such as an under-current sensor for preventing use of gaseous fuel in addition to liquid fuel under no-load and low-load conditions, an over-current sensor for preventing use of gaseous fuel in addition to liquid fuel under excessive-load conditions, an intake-air sensor for preventing use of gaseous fuel in addition to liquid fuel when there is inadequate supply of air, a liquid-fuel-supply sensor for triggering a warning lamp only when there is inadequate supply of liquid fuel, and an exhaust-gas-temperature sensor for shutting down dual-fuel mode when exhaust heat is excessive. Red LED lights warn of system faults. The engine does not shut down when one or more parameters fail. Professional resetting is required in order to alert operators of possible dangers when the system has been shut down from excessive exhaust-gas heat.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF DRAWINGS

This invention is described by appended claims in relation to description of a preferred embodiment with reference to the following drawings which are described briefly as follows:

FIG. 2 is a schematic view from which

FIG. 3 is an exploded top-right section of the FIG. 2 schematic view;

FIG. 4 is an exploded top-left section of the FIG. 2 schematic view;

FIG. 5 is an exploded bottom-left section of the FIG. 2 schematic view; and

FIG. 6 is an exploded bottom-right section of the FIG. 2 schematic view;

DESCRIPTION OF PREFERRED EMBODIMENT

Figure 1:
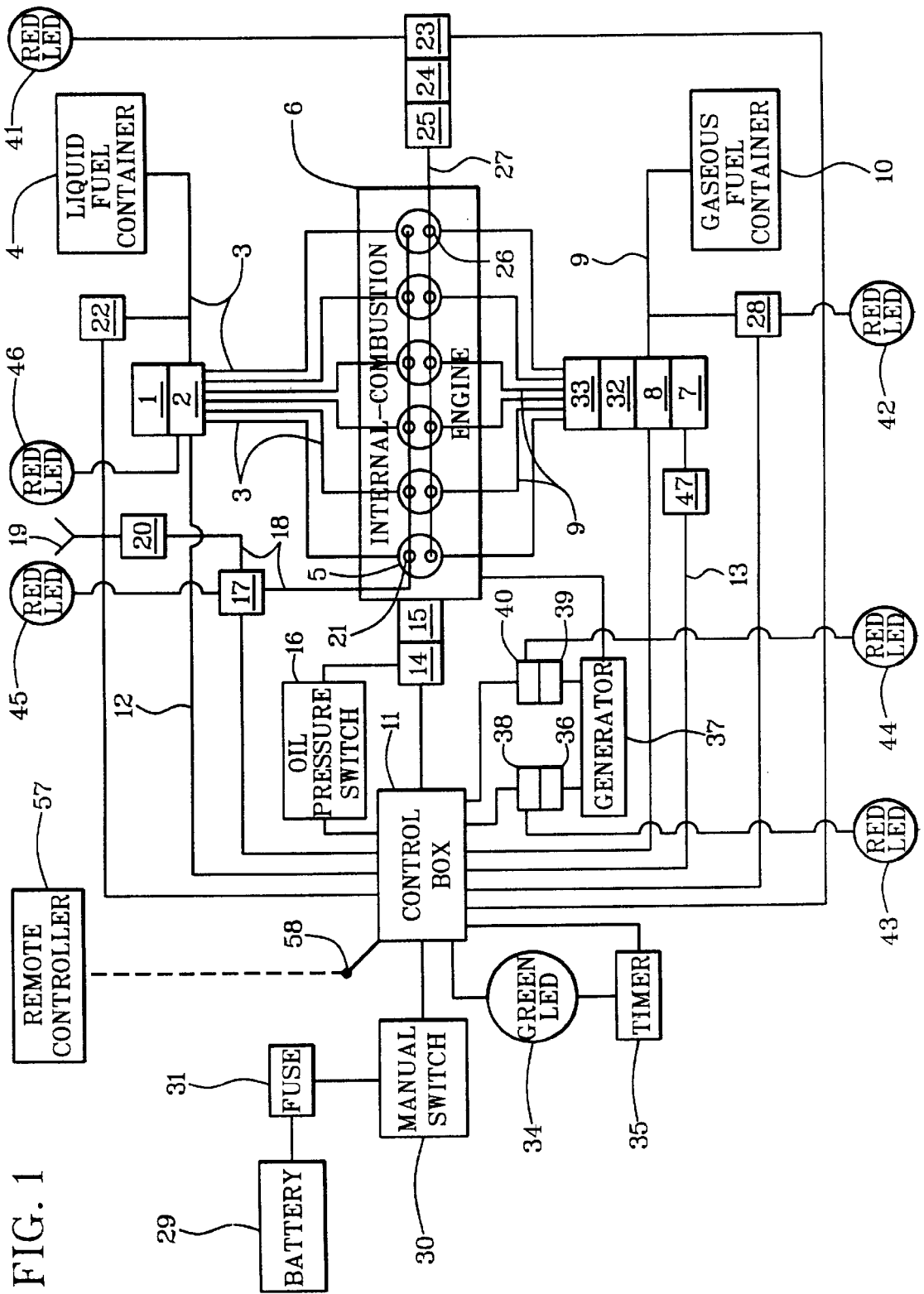
FIG. 1 is a plan view.

Listed numerically below with reference to the drawings are terms used to describe features of this invention. These terms and numbers designate the same features throughout this description.

1. Liquid-fuel supplier
2. Liquid-fuel regulator
3. Liquid-fuel conveyance
4. Liquid-fuel container
5. Cylinder
6. Internal-combustion engine
7. Gaseous-fuel supplier
8. Gaseous-fuel regulator
9. Gaseous-fuel conveyance
10. Gaseous-fuel container
11. Control box
12. Liquid-control line
13. Gaseous-control line
14. Oil-pressure sensor
15. Engine-oil pressurizer
16. Oil-pressure switch
17. Intake-air sensor
18. Intake-air conveyance
19. Air inlet
20. Air filter
21. Intake orifices
22. Liquid-fuel sensor
23. Exhaust-gas-temperature monitor
24. Thermocouple
25. Turbocharger
26. Exhaust orifice
27. Exhaust conveyance
28. Gaseous-fuel sensor
29. Battery
30. Manual switch
31. Fuse
32. Gas-supply switch
34. Green LED
35. Timer
36. Under-current sensor
37. Generator
38. Under-current switch
39. Over-current sensor
40. Over-current switch
41. EGT red LED
42. Gas-pressure red LED
43. Under-current red LED
44. Over-current red LED
45. Air-supply red LED
46. Liquid-fuel red LED
47. Gaseous-fuel shutoff valve
48. 24-volt relay
49. 12-volt bus
50. Vacuum switches
51. Pressure switches
52. Exhaust gas temperature reset switch
53. 12-volt relay
54. Current transfortner
56. Diesel flow control valve
57. Remote controller
58. Control-box terminal Referring first to FIG. 1, a liquid-fuel supplier 1 has a liquid-fuel regulator 2 proximate a liquid-fuel conveyance 3 for conveying liquid fuel from a liquid-fuel container 4 to at least one cylinder 5 of an internal-combustion engine 6. For internal-combustion engines 6 with compression ignition such as diesel engines, the liquid-fuel supplier 1 is a high-pressure pump and the liquid-fuel conveyance 3 delivers the liquid fuel to the cylinder 5 under sufficient pressure to spray-atomize the liquid fuel into the cylinder 5 after compression of air in the cylinder 5. For internal-combustion engines 6 with electrical-heat ignition such as spark-plug and glow-plug engines, the liquid-fuel supplier 1 can be a variously low-pressure pump and the liquid-fuel conveyance 3 conveys the liquid fuel to the cylinder 5 before compression of air in the cylinder 5.

A gaseous-fuel supplier 7 has a gaseous-fuel regulator 8 proximate a gaseous-fuel conveyance 9 for conveyance of gaseous fuel from a gaseous-fuel container 10 to the cylinder 5 of the internal-combustion engine 6 either before or after compression for particular engine designs.

A control box 11 has electrically powered control of the liquid-fuel regulator 2 through liquid-control line 12 and has electrically powered control of the gaseous-fuel supplier 7 through gaseous-control line 13.

An oil-pressure sensor 14 has pressure-sensing communication with an engine-oil pressurizer 15 for the internal-combustion engine 6. An oil-pressure switch 16 has switching communication intermediate the oil-pressure sensor 14 and the control box 11.

To assure an appropriate supply of air for operation of the internal-combustion engine 6 in dual-fuel mode, flow of intake air is monitored with an intake-air sensor 17 in air-flow-sensing communication with an intake-air conveyance 18 from an air inlet 19, through an air filter 20 and then to intake orifices 21 in the cylinder 5. Adequate supply of air fluidly downstream from the air inlet 19 and the air filter 20 is a critical factor for regulating supply of gaseous fuel to the internal-combustion engine 6.

Prior to adding gaseous fuel for dual-fuel mode, appropriate operation of the internal-combustion engine 6 in liquid-fuel mode is monitored by a liquid-fuel sensor 22 for sensing liquid-flow communication with the liquid-fuel conveyance 3 to the cylinder 5.

Combustion heat resulting from rate of gaseous fuel added to cylinders 5 operating in dual-fuel mode is monitored by an exhaust-gas-temperature monitor 23 for regulation to prevent temperature of combustion gases from increasing beyond tolerances of engine materials made possible by engine-cooling systems. Preferably for determining actual combustion temperature, the exhaust-gas-temperature monitor 23 employs at least one thermocouple 24 that is positioned as near fluidly downstream as possible from a turbocharger 25 or other immediate outlet from exhaust orifices 26 in an exhaust conveyance 27. Flow capacity of gaseous fuel to the gaseous-fuel regulator 8 can be monitored for normalcy, restriction or obstruction by a gaseous-fuel sensor 28 in communication intermediate the control box 11 and the gaseous-fuel conveyance 9.

In electrical-control communication with the control box 11 are the intake-air sensor 17, the liquid-fuel sensor 22 and the exhaust-gas-temperature monitor 23 for operation of a gaseous-fuel shutoff valve 47 intermediate the control box 11 and the gaseous-fuel supplier 7 for controlling flow of gaseous fuel for dual-fuel mode of operation.

The control box 11 receives electrical current from a battery 29 or other engine-electrical component when activated by a manual switch 30. Electrical supply through either the oil-pressure switch 16 or the manual switch 30 is under electrical protection by at least one in-line electrical fuse 31.

A gas-supply switch 32 that turns off supply of the gaseous fuel supplied through the gaseous-fuel regulator 8 in response to predetermined exhaust-gas temperatures.

A green LED 34 in electrical communication with the control box 11 indicates operation of the gaseous-fuel supplier 7 for dual-fuel mode which is timed by hours of operation with a timer 35.

An under-current sensor 36 in electrical communication with a generator 37 of an engine electrical system has an under-current switch 38 for turning off the gaseous-fuel supplier 7 through the control box 11 in response to a predetermined lowness of current generated by the generator 37 in order to prevent over-fueling with gaseous fuel during no-load and low-load operation of the internal-combustion engine 6 under such operating conditions as idling. Conversely, an over-current sensor 39 in electrical communication with the generator 37 has an over-current switch 40 for turning off the gaseous-fuel supplier 7 through the control box 11 in response to a predetermined excess of current generated by the generator 37 in order to prevent over-fueling with gaseous fuel during high-load operation of the internal-combustion engine 6.

A plurality of red LEDs can be employed as separate system-fault indicators. Included can be an EGT red LED 41 for warning of excessive exhaust heat, a gas-pressure red LED 42 for warning of inadequate gas pressure, an under-current red LED 43 for warning of inadequate generation of electrical current as a result of low engine speed, an over-current red LED 44 for warning of excessive generation of electrical current as a result of excessive engine speed, an air-supply red LED 45 for warning of inadequacy of supply of intake air, and a liquid-fuel red LED 46 for warning of insufficiency of supply of liquid fuel.

Figure 2:
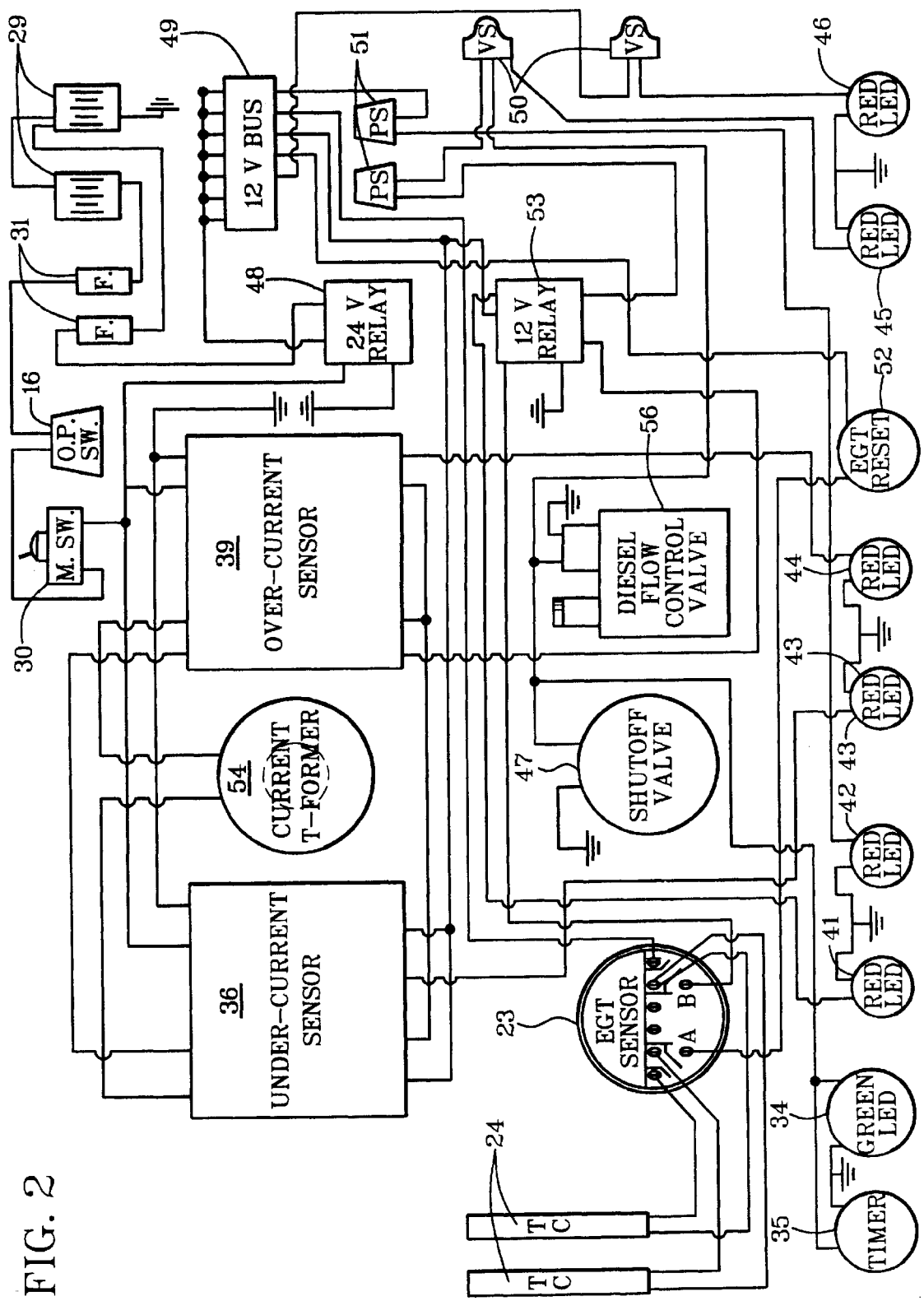

Referring to FIGS. 1–2, a drawing of a preferred schematic representation of control components of the dual-fuel-engine monitoring-and-control system for a typical diesel engine requires intentional instead of automatic dual-fuel operation by positioning the oil-pressure switch 16 intermediate the manual switch 30 and a dual fuse for the fuse 31 en route from typically a double battery 29 as indicated. Leading from the manual switch 30 is a line to the under-current sensor 36, the over-current sensor 39 and a 24-volt relay 48. Downstream electrically from the 24-volt relay 48, a terminal bus block such as 12-volt bus 49 branches out a single DC power input into a plurality of DC current outputs to supply control components with needed voltage as shown. Included in the plurality of control components are two vacuum switches 50 and two pressure switches 51.

The green LED 34 is activated and time of dual-fuel mode is timed in hours by the timer 35 when the dual-fuel system is in operation. Six red LED lights are wired to indicate operational faults of the dual-fuel system. All of the red LED lights are labeled and positioned for visibility by an operator. Included as shown in the plan drawing FIG. 1 and as shown schematically in FIG. 2 are the EGT red LED 41, the gas-pressure red LED 42, the under-current red LED 43, the over-current red LED 44, the air-supply red LED 45 and the liquid-fuel red LED 46. The exhaust-gas temperature monitor 23 monitors the exhaust gas temperature through a K-type thermocouple. The monitor 23 is set by technicians to engine manufacturer specification. If the exhaust gas temperature exceeds setting, the dual-fuel system will deactivate returning the engine to 100% diesel operation. The engine will not restart until reset by pushing the unit switch 52 which is done only by authorized personnel in order to alert them of the existence of a possible problem in the system.

A 12-volt relay 53 also receives current from the 12-volt bus 49 for distribution of needed current to control components.

A current transformer 54 is provided for signaling to the under-current sensor 36 and to the over-current sensor 39 as needed, such as in the absence of power from the generator 37.

Figure 3:
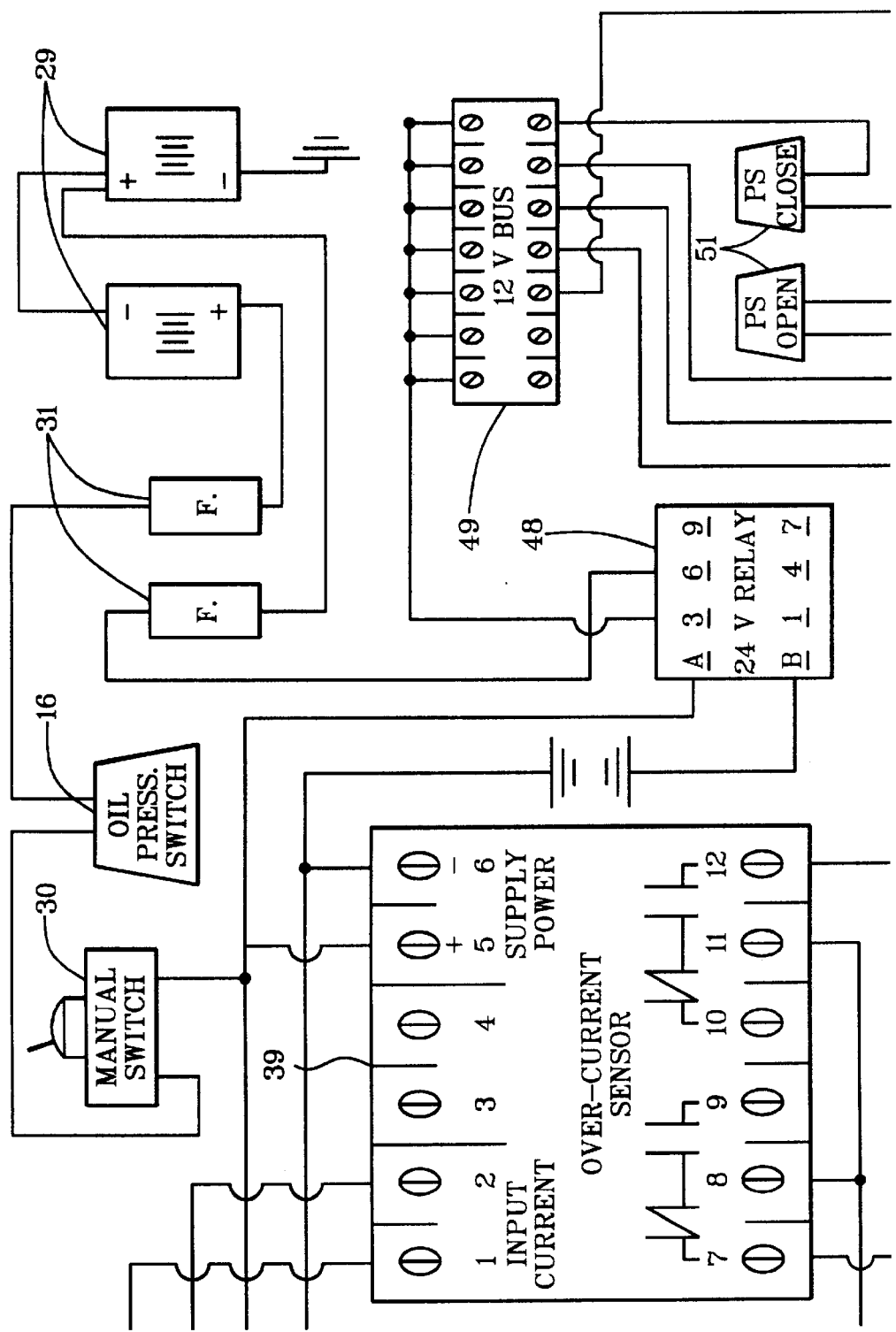
FIGS. 3–6 are taken as exploded sections of control components counterclockwise.

FIG. 3 shows detail of FIG. 2 in relation to the manual switch 30, the oil-pressure switch 16, the fuse 31, the battery 29, the over-current sensor 39, the 24-volt relay 48, the 12-volt bus 49 and the two pressure switches 51.

Figure 4:
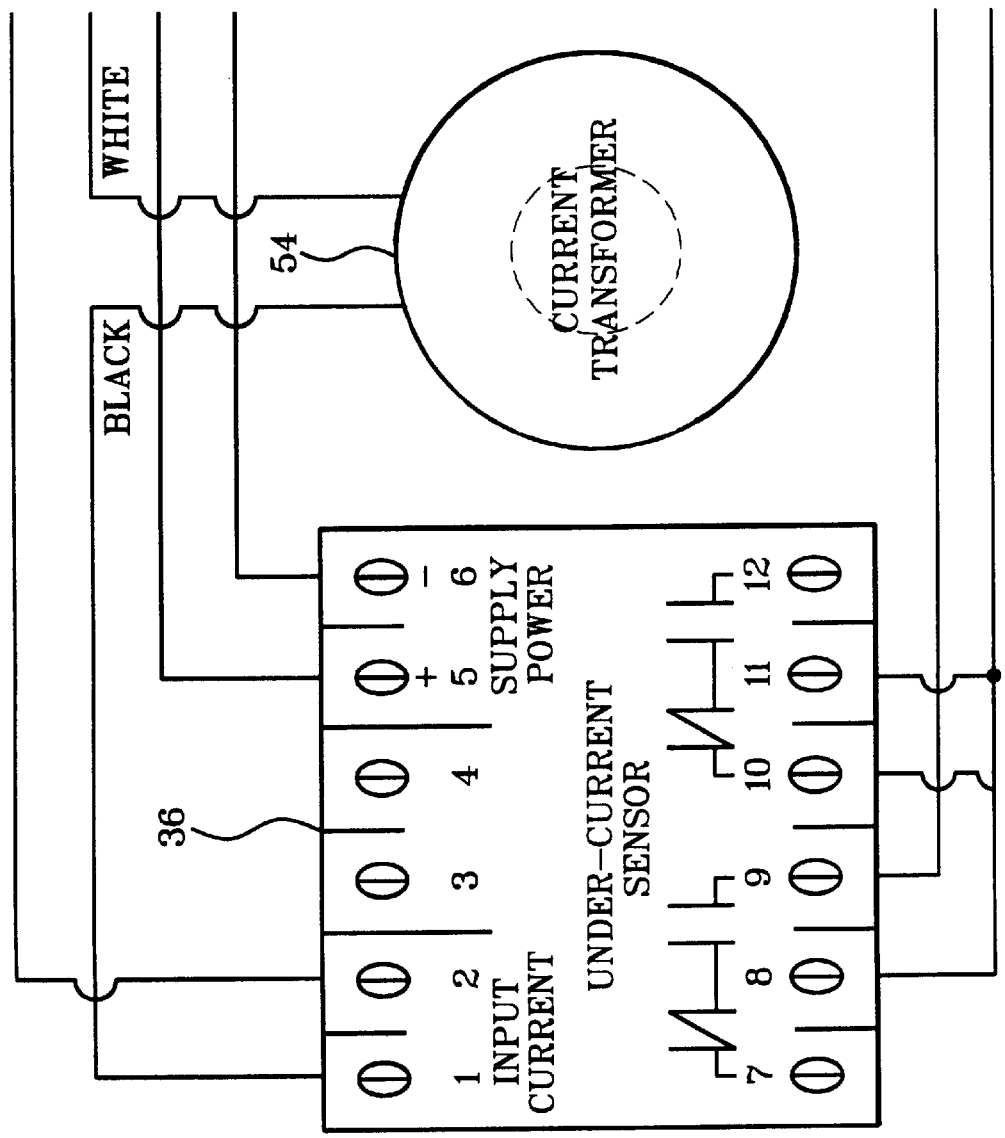

FIG. 4 shows detail of FIG. 2 in relation to the under-current sensor 36 and the current transformer 54.

Figure 5:
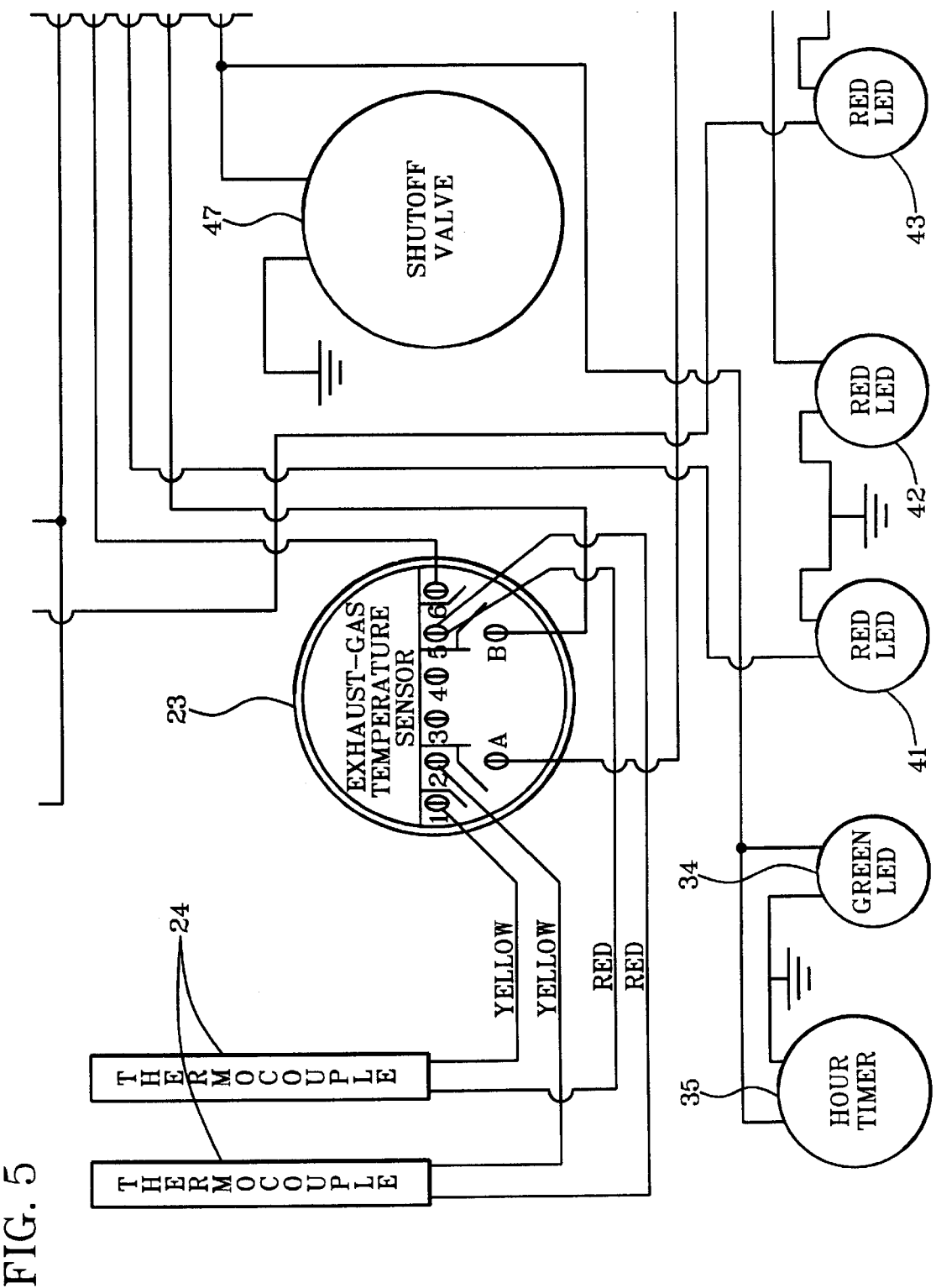

FIG. 5 shows detail of FIG. 2 in relation to a gaseous-fuel shutoff valve 47, the exhaust-gas-temperature monitor 23, the thermocouple 24, the timer 35, the green LED 34, the EGT red LED 41, the gas-pressure red LED 42 and the under-current red LED 43.

Figure 6:
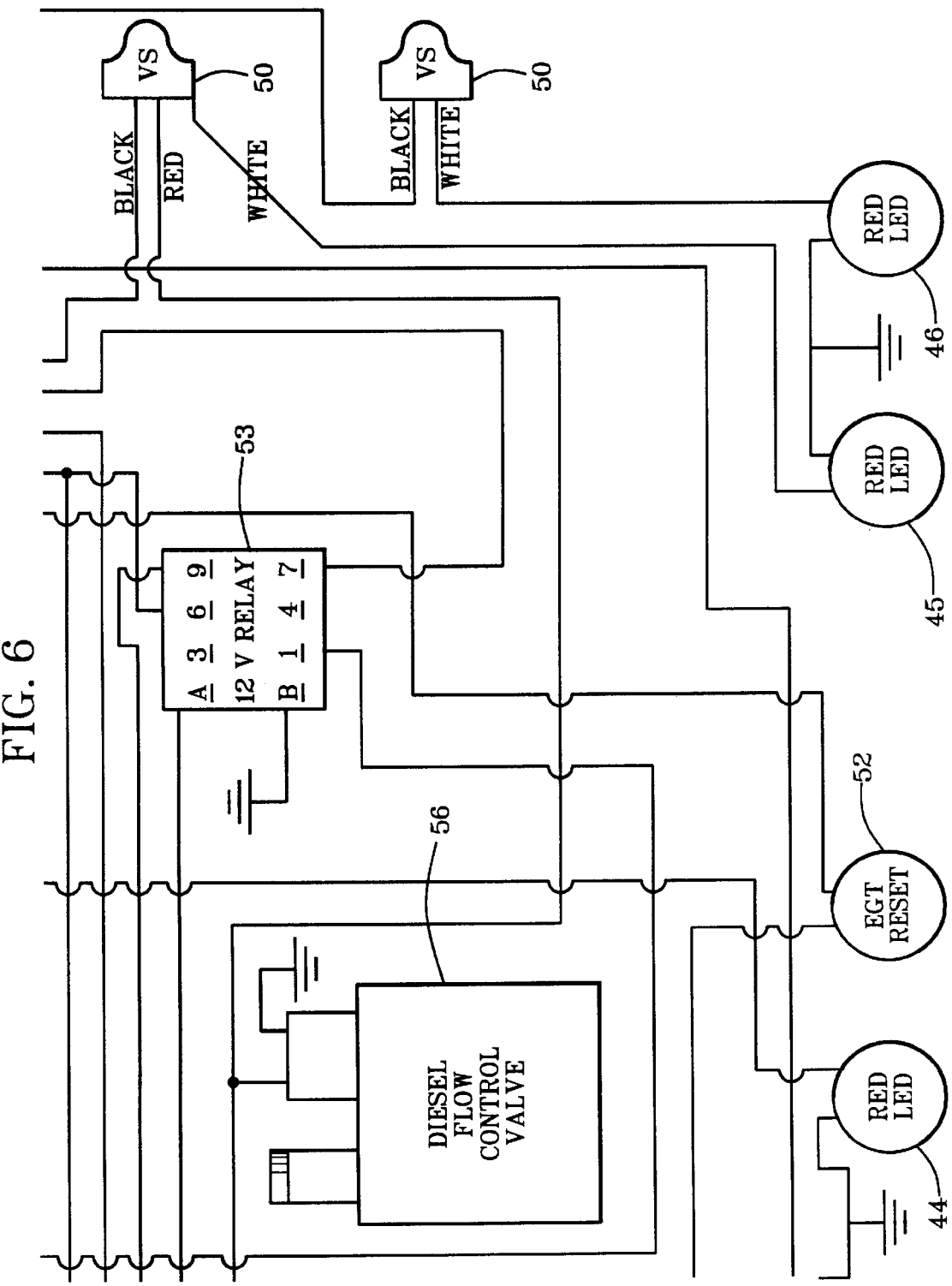

FIG. 6 shows detail of FIG. 2 in relation to the over-current red LED 44, the air-supply red LED 45, the liquid-fuel red LED 46, the reset exhaust gas temperature switch 52, the vacuum switches 50, the 12-volt relay 53 and a diesel flow control valve 56.

Referring further to FIG. 1, the control box 11, the control components of the control box 11 and engine components that can be monitored, controlled and operated from the control box 11 also can be monitored, controlled, switched, set, reset and operated selectively from a remote controller 57 having wireless communication with the control box 11 through a control-box terminal 58 on the control box 11.

Referring to all FIGS. in relation to the system generally, the control box 11 monitors a plurality of professionally set or field-set parameters simultaneously and will control on-off switching of the duel-fuel operation when parameters are above or below set levels entered by field technicians. If any parameter setting is not within a predetermined range, the control box 11 will switch off all dual-fuel components, returning the internal-combustion engine 6 to full liquid-fuel operation automatically and activating an LED fault signal to indicate which parameter has faulted. Dual-fuel mode is terminated without interruption of power from the internal-combustion engine 6. When parameters except exhaust-gas temperature return to predetermined settings, the control box 11 will switch the system back to dual-fuel operation automatically without power loss.

Exhaust-gas temperature is the most critical operating parameter. When this parameter is exceeded, the control box 11 will shut down dual-fuel operation until restarted. To restart dual-fuel operation, the exhaust-gas-temperature monitor 23 needs to be reset by qualified technical personnel. This requiring of qualified technical personnel assures awareness by operating personnel of possible problems with the internal-combustion engine 6.

A major factor of this system is that shut down of the control box and termination of dual-fuel operation does not shut down a diesel engine or other internal-combustion engine 6 on which it is used. This is a safety feature for the internal-combustion engine 6. It helps to increase engine life while also providing dual-fuel operation within predetermined parameters.

A new and useful dual-fuel-engine monitoring-and-control system having been described, all such foreseeable modifications, adaptations, substitutions of equivalents, mathematical possibilities of combinations of parts, pluralities of parts, applications and forms thereof as described by the following claims and not precluded by prior art are included in this invention.

What is claimed is:

1. A dual-fuel-engine monitoring-and-control system comprising:

a liquid-fuel supplier having a liquid-fuel regulator proximate a liquid-fuel conveyance for conveying liquid fuel from a liquid-fuel container to at least one cylinder of an internal-combustion engine;

a gaseous-fuel supplier having a gaseous-fuel regulator proximate a gaseous-fuel conveyance for conveying gaseous fuel from a gaseous-fuel container to the cylinder of the internal-combustion engine;

a control box having electrically powered control of the gaseous-fuel regulator and the liquid-fuel regulator selectively;

an oil-pressure switch for regulatory switching communication for turning power on and off on the control box;

an intake-air sensor for airflow-sensing communication with an intake-air conveyance to the cylinder of the internal-combustion engine;

a liquid-fuel sensor for liquid-flow-sensing communication with the liquid-fuel conveyance to the cylinder of the internal-combustion engine;

an exhaust-gas-temperature monitor for temperature-sensing communication with an exhaust outlet proximate the cylinder of the internal-combustion engine;

the intake-air sensor, the liquid-fuel sensor and the exhaust-gas-temperature monitor being in electrical communication with the control box; and a gaseous-fuel shutoff valve in electrical communication intermediate the control box and the gaseous-fuel supplier.

2. A dual-fuel-engine monitoring-and-control system as described in claim 1 and further comprising:

a gas-pressure sensor for pressure-sensing communication with the gaseous conveyance from the gaseous-fuel container to the cylinder of the internal-combustion engine; and predetermined gas-supply switching conveyance intermediate the gas-pressure sensor and the control box.

3. A dual-fuel-engine monitoring-and-control system as described in claim 1 wherein:

the exhaust-gas-temperature monitor is a thermocouple for communication with exhaust gas in immediate proximity to outlet of the exhaust gas from the internal-combustion engine.

4. A dual-fuel-engine monitoring-and-control system as described in claim 3 wherein:

the outlet of the exhaust gas from the internal-combustion engine is immediately downstream fluidly from a turbocharger.

5. A dual-fuel-engine monitoring-and-control system as described in claim 1 wherein:

the gaseous-fuel regulator has a gaseous-fuel shutoff valve that turns off supply of the gaseous fuel in response to predetermined exhaust-gas temperature.

6. A dual-fuel-engine monitoring-and-control system as described in claim 5 and further comprising:

a push-button switch on the control box for resetting the gaseous-fuel shutoff valve manually.

7. A dual-fuel-engine monitoring-and-control system as described in claim 1 and further comprising:

at least one electrical fuse having predetermined termination of electrical communication intermediate the control box and an electrical power source such as a battery.

8. A dual-fuel-engine monitoring-and-control system as described in claim 1 and further comprising:

a manual switch having manually controllable electrical communication intermediate the control box and the electrical power source.

9. A dual-fuel-engine monitoring-and-control system as described in claim 1 and further comprising:

at least one terminal bus having a predetermined plurality of electrical outlets from the oil-pressure switch to engine components for control with the control box.

10. A dual-fuel-engine monitoring-and-control system as described in claim 9 wherein:

the at least one terminal bus is electrically downstream from a 24 V DC relay in electrical communication with components that are controlled with the control box.

11. A dual-fuel-engine monitoring-and-control system as described in claim 1 and further comprising:

a green LED light having electrical communication with the control box when the gaseous-fuel supplier is operative.

12. A dual-fuel-engine monitoring-and-control system as described in claim 1 and further comprising:

a timer having electrical communication with the control box when the gaseous-fuel supplier is operating.

13. A dual-fuel-engine monitoring-and-control system as described in claim 1 and further comprising:

an under-current sensor in electrical communication with a generator of the electrical system of the internal-combustion engine; and the under-current sensor having an under-current switch for turning off the gaseous-fuel supplier in response to predetermined lowness of current generated by the generator in order to prevent over-fueling with gaseous fuel during no-load and low-load operation of the internal-combustion engine under such operating conditions as idling.

14. A dual-fuel-engine monitoring-and-control system as described in claim 1 and further comprising:

an over-current sensor for electrical communication with the generator of the electrical system of the internal-combustion engine; and the over-current sensor having an over-current switch for turning off the gaseous-fuel supplier in response to predetermined excess of current generated by the generator in order to prevent over-fueling with gaseous fuel during high-load operation of the internal-combustion engine.

15. A dual-fuel-engine monitoring-and-control system as described in claim 1 and further comprising:

a current transformer having electrical communication from the oil-pressure switch to the under-current sensor and the over-current sensor.

16. A dual-fuel-engine monitoring-and-control system as described in claim 1 and further comprising:

at least one red LED light having electrical communication with at least one system-fault indicator for the internal-combustion engine; and the red LED light is a warning light that is labeled for the system-fault indicator.

17. A dual-fuel-engine monitoring-and-control system as described in claim 16 wherein:

the at least one red LED light is a plurality of red LED lights having electrical communication with a plurality of system-fault indicators separately for warning of separate system faults with separate red LED lights.

18. A dual-fuel-engine monitoring-and-control system as described in claim 17 wherein:

the plurality of red LED lights include (1) an EGT red LED for electrical communication with the exhaust-gas-temperature monitor for warning of excessive exhaust heat, (2) a gas-pressure red LED for electrical communication with pressurized gaseous fuel for warning of inadequate gas pressure, (3) an under-current red LED for electrical communication with the electrical-system generator for warning of inadequate generation of electrical current as a result of low engine speed, (4) an over-current red LED for electrical communication with the electrical-system generator for warning of excessive generation of electrical current as a result of excessive engine speed, (5) an air-supply red LED for electrical communication with the intake-air sensor for warning of inadequacy of supply of intake air, and (6)

a liquid-fuel red LED for electrical communication with the liquid-fuel sensor for warning of inadequacy of supply of liquid fuel.

19. A dual-fuel-engine monitoring-and-control system as described in claim 1 and further comprising:

a remote controller having wireless communication with the control box through a control-box terminal on the control box for operating the control box.

20. A method comprising the following steps for adapting an internal-combustion engine to utilize a high proportion of gaseous fuel in proportion to liquid fuel without operative damage to the internal-combustion engine or to an engine system powered by the internal-combustion engine:

providing a gaseous-fuel supplier having a gaseous-fuel regulator that is controllable by a control box for operation when engine-oil pressure of the internal-combustion engine is adequate to indicate a predetermined minimum engine rotational speed and engine rate of use of liquid fuel supplied by a liquid-fuel supplier to use in addition to a predetermined minimum rate of use of the gaseous fuel;

monitoring operational parameters of the internal-combustion engine and of select components of the internal-combustion engine that are indicative of acceptable predetermined rates of use of the gaseous fuel in proportion to use of the liquid fuel at varying engine work loads;

regulating select operational parameters of the internal-combustion engine and of the components of the internal-combustion engine that can be regulated to maintain the acceptable predetermined rates of use of the gaseous fuel in proportion to use of the liquid fuel at the varying engine work loads; and terminating operation of the gaseous-fuel supplier without terminating operation of the liquid-fuel supplier in response to operational parameters of the internal-combustion engine and of the select components of the internal-combustion engine that can not be regulated for maintaining the acceptable predetermined rates of use of the gaseous fuel in proportion to use of the liquid fuel at the varying engine rotational speeds and work loads.

* * * * *